United States Patent [19]
Jacobson

[11] 3,867,789
[45] Feb. 25, 1975

[54] SELF-LOCKING FLORIST PLANTER

[76] Inventor: Benjamin D. Jacobson, c/o Craftsman Products Co., 13 E. Worcester St., Worcester, Mass.

[22] Filed: Mar. 5, 1973

[21] Appl. No.: 338,346

[52] U.S. Cl. ............................. 47/41.12, 47/41.1
[51] Int. Cl. .......................... A01b 5/00, A47g 7/00
[58] Field of Search .............. 47/41.1, 41.12, 41.13, 47/41.11

[56] References Cited
UNITED STATES PATENTS

| | | | |
|---|---|---|---|
| 1,213,194 | 1/1917 | Hill | 47/41.11 |
| 2,984,045 | 5/1961 | Eggan | 47/41.12 |
| 2,994,985 | 8/1961 | Jackson | 47/41.12 X |
| 3,302,326 | 2/1967 | Maino | 47/41.1 |
| 3,368,303 | 2/1968 | Tong | 47/41.12 |
| 3,369,321 | 2/1968 | Blackistone | 47/41.1 |
| 3,745,702 | 7/1973 | Ogawa | 47/41.13 |

Primary Examiner—Edgar S. Burr
Assistant Examiner—Paul T. Sewell
Attorney, Agent, or Firm—Charles R. Fay

[57] ABSTRACT

A florist's planter comprising a vessel having inwardly directed generally radially arranged fins which are spaced sufficiently for the reception of a block of cellular florist's plant or stem holding material between the fins so that upon rotating the florist material the same impinges upon said fins which cut into the florist material and become embedded therein.

1 Claim, 5 Drawing Figures

SELF-LOCKING FLORIST PLANTER

BACKGROUND OF THE INVENTION

In assembling flower arrangements the florist inserts a block of water absorbing cellular foam material or the like into a vessel or dish. The foam material must then be anchored against rising or shifting by taping it into the vessel before setting in the cut flower stems. This is not only time consuming and leaves the strips of tape which are unsightly over the sides of the planter, but until this invention there was no other method available for securing the foam in the vessel so that taping is standard practice. It is the object of the present invention to provide an invisible self-locking device for the florist to hold foam in position in the vessel ready to receive the stems.

SUMMARY OF THE INVENTION

An open top vessel such as a planter, dish, or the like, is provided with diametrically opposite radially arranged inwardly extending fins which are spaced apart sufficiently so that the block of cellular foam that florists use for the purpose may be placed between the fins and then rotated about 90°. The fins slice into the foam material becoming embedded, so that the latter is self locking with respect to said fins and hence to the vessel, leaving the foam material securely in place as long as desired.

The fins may be molded integrally with the vessel; they may be drawn in in the case of a metal dish; or they may be separate and attached by any desired means at the proper location in the vessel.

The planters used may be round, square, oblong, or any shape, and the foam used is a yielding material and easily gives way in the manner described.

PREFERRED EMBODIMENT OF THE INVENTION

Figure 1:
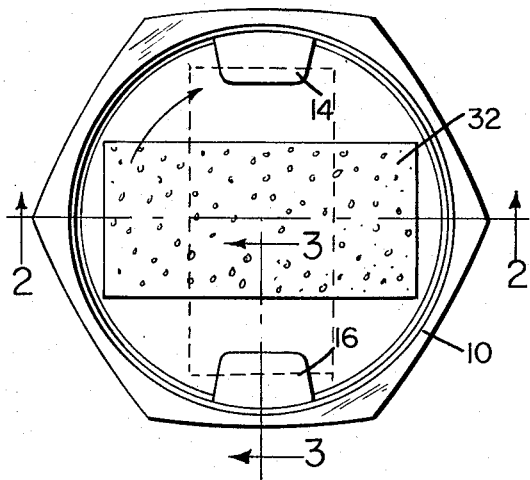
FIG. 1 is a plan view of a vessel embodying the invention and illustrating the method of applying the foam material.
Figure 3:
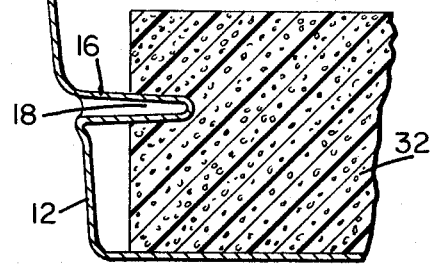
FIG. 3 is an enlarged section illustrating one manner of forming the fins.
Figure 2:
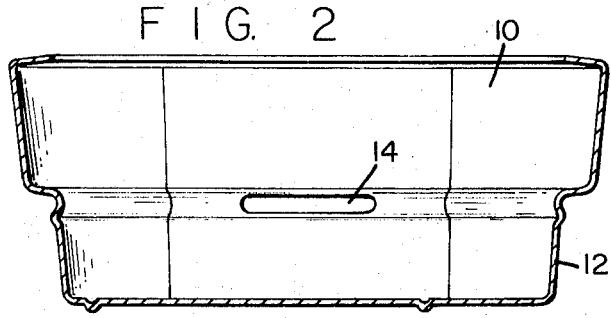
FIG. 2 is a section on line 2—2 of FIG. 1.

As shown in FIG. 1 an open top vessel having any kind of configuration desired as well as ornamentation, etc., is indicated at 10. This vessel may if desired be provided with a reduced lower portion as at 12 but in any event it is provided with diametrically opposed radially extending inwardly directed fins 14, 16 intermediate the bottom and the open top or rim of the vessel. These fins may be made by indentation or drawing of the material as indicated at 18 in FIG. 3 wherein the fin shown is provided with a kind of narrow U-shaped form. The fins need not be sharp but may be rounded as desired as shown.

Figure 4:
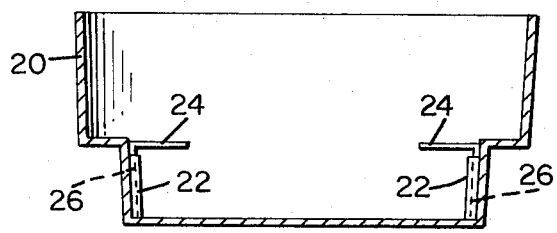
FIG. 4 is a view illustrating detachable fins attached into the vessel.

Also the fins may be separate and attached by any means desired as shown in FIG. 4 wherein the vessel 20 is provided with tubular or slotted members 22, 22 in which the fins 24, 24 are set by means of telescopic bases 26, 26.

Figure 5:
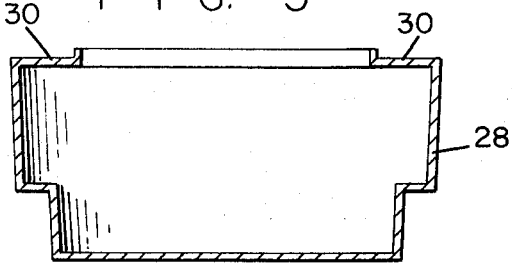
FIG. 5 illustrates a modification.

Another form of the invention is shown in FIG. 5 wherein a molded planter 28 is provided with inwardly directed flanges 30, 30 at the top edge of the planter. Any surplus material may be moved, but the operation is the same as described for the other forms except for the fact that the florists foam material must be thick enough to impinge upon fins 30, 30.

There are other ways of providing fins but the invention contemplates use of any kind of fin in a vessel which will accomplish the purpose. This purpose is carried out by providing a florist block of cellular foam material indicated at 32 in FIG. 1. This block of material has a width to fit in between fins 14 and 16, as shown, and also has a length so that upon turning the block 32 90° the fins slice right into the block at the ends thereof and thereby hold the same in position. This forms an actual mechanical self-locking device and does away with the necessity for taping the material down in the planter.

Another way of applying the foam is to insert a block of the right size to one side of the fins 14, 16 and then shove the block laterally until the fins slice into the block and hold it in position. A block of the foam material could be applied at each side of the fins to provide a larger amount of foam material in the planter for the purpose described.

This invention eliminates the need of taping, thereby saving time and expensive tape, and also since the fins substantially are obliterated by the foam block once it is in position, the fins are substantially invisible and the vessel is a great deal more attractive than it would be were the tape visible as in the past.

The fins, flanges, etc., may be of any desired shape, triangular, rounded, square, etc., or they may even be in the nature of spikes.

I claim:

1. The combination of a florists' planter including a bottom and side walls with a block of water-absorbing cellular flower stem holding material, including a horizontal material slicing fin on a side wall of the planter, the fin being integral with the side wall of the planter, and extending only part way into the planter above the bottom thereof, leaving a void in a vertical direction in the planter into which void the block of cellular material may be freely inserted to rest on the bottom of the planter, the block being of a size to enter the void, whereby a twist of the block on a vertical axis may cause the fin to slice into the block and become lodged therein, the block of cellular material having a thickness greater than the height of the fin above the bottom of the planter.

* * * * *